No. 759,594. PATENTED MAY 10, 1904.
C. F. CRAWFORD.
SPIRIT LEVEL.
APPLICATION FILED JAN. 14, 1904.
NO MODEL.

Witnesses:
Inventor
C. F. Crawford,
By N. C. Everts & Co.
Attorneys.

No. 759,594. Patented May 10, 1904.

UNITED STATES PATENT OFFICE.

CHARLES F. CRAWFORD, OF PITTSBURG, PENNSYLVANIA.

SPIRIT-LEVEL.

SPECIFICATION forming part of Letters Patent No. 759,594, dated May 10, 1904.

Application filed January 14, 1904. Serial No. 188,968. (No model.)

*To all whom it may concern:*

Be it known that I, CHARLES F. CRAWFORD, a citizen of the United States of America, residing at Pittsburg, in the county of Allegheny and State of Pennsylvania, have invented certain new and useful Improvements in Spirit-Levels, of which the following is a specification, reference being had therein to the accompanying drawings.
This invention relates to certain new and useful improvements in levels, and more particularly to that class of levels which are employed by masons for determining the plane of different bodies.
The object of my invention is to provide a level having therein a plurality of level-glasses whereby the same may be used to determine the vertical plane of a body as well as the horizontal, and upon this level I provide means whereby a plumb-line may be suspended to determine the vertical plane of different bodies.

Briefly described, my improved level consists of a body portion having therein a plurality of apertures in which I locate the level-glasses, one or more of these glasses being arranged in a horizontal position, and in the one end of the body portion of the level I provide an aperture in which is adapted to swing the weight of the plumb-line, which is attached to the other end of the level.

Figure 1:
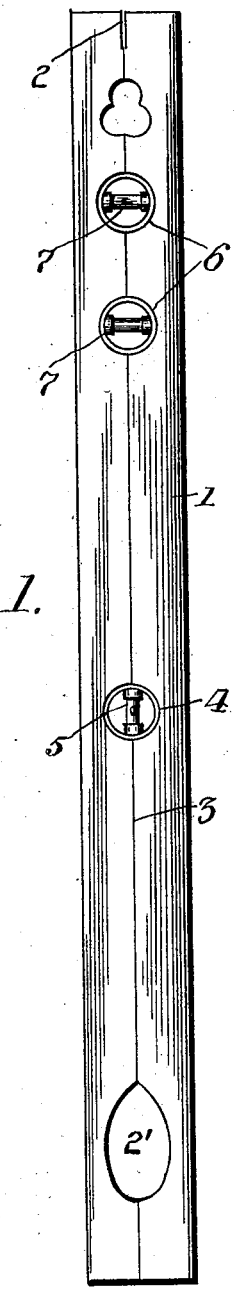
Figure 2:
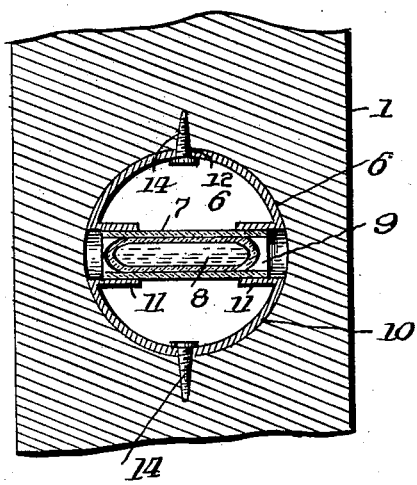
Figure 3:
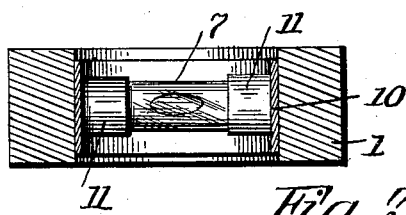
Figure 4:
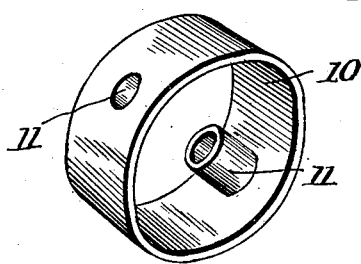

My invention further consists in the novel construction, combination, and arrangement of parts to be hereinafter more fully described, and specifically pointed out in the claims.
In describing the invention in detail reference is had to the accompanying drawings, forming a part of this application, and wherein like numerals of reference indicate like parts throughout the several views, in which—
Figure 1 is a side elevation of my improved level. Fig. 2 is a vertical sectional view of a portion of the level. Fig. 3 is a horizontal sectional view showing one of the horizontal level-glasses, and Fig. 4 is a detail perspective view of one of the frames in which the water-level is placed prior to securing the same within the level.

To put my invention into practice, I provide a body portion 1, which constitutes the level proper, and in the upper end of this body portion I provide a slot 2, in which is adapted to be secured one end of a plumb-line, which is of the ordinary type, having a weight on its one end, and in the lower end of the body portion 1 I provide an aperture 2′, in which this weight is adapted to swing. On the surface of the level is provided a line 3, with which the plumb-line when vertical is adapted to coincide, this line being provided to indicate when the plumb-line is not hanging true with respect to the body to which it is applied.

Centrally of the body portion I provide an aperture 4, in which I secure a level-glass 5, which is placed therein in longitudinal alinement with the body portion 1, and in the upper end of the body portion 1 I provide the apertures 6, in which the level-glasses 7 are secured, these level-glasses being placed at right angles to that of the glass 5, whereby two different planes may be determined by the level. The level-glasses consist of the vacuum-tube 8, which is of the ordinary construction generally used, and around this tube I provide an extra tubing 9 to further protect the tube 8 and prevent the same from becoming broken or otherwise damaged. The tubes 8 and 9 are secured in the level by an annular band 10, having formed therein and diametrically opposite each other the collars 11, these collars being formed integral with the band 10, and in them is adapted to be placed the tubes 8 and 9, these tubes being placed therein prior to placing the band 10 within the aperture 6. In the bands 10 I provide apertures 12, through which pass the screws 14, which are adapted to engage the body portion 1 of the level and rigidly hold the band 10 within the aperture formed in the body portion 1.

It will thus be seen that my improved level consists of a plurality of level-glasses, which may be renewed from time to time within the level.

While I have illustrated my improved level as having therein one vertical glass and two horizontal glasses, it will be seen that I may readily employ a number of vertical glasses and any number of horizontal glasses and I may make other slight changes in the details of construction of my level without departing from the general spirit of my invention.

Having fully described my invention, what I claim as new, and desire to secure by Letters Patent, is—

1. A level comprising a body portion having a plurality of apertures formed therein, annular bands having collars at diametrically opposite points thereon secured in said apertures, glass tubes in said collars, and level-glasses received in said glass tubes.

2. A level comprising an apertured body portion, bands arranged in the apertures and carrying collars interiorly thereof, a level-glass surrounded by a glass tube, the ends of said tubes received in said collars.

In testimony whereof I affix my signature in the presence of two witnesses.

C. F. CRAWFORD.

Witnesses:
H. C. EVERT,
W. C. HEITZ.